(12) United States Patent
Barron et al.

(10) Patent No.: US 12,434,610 B2
(45) Date of Patent: Oct. 7, 2025

(54) RECREATIONAL VEHICLE HAVING A PLURALITY OF SUPPORT BRACKETS

(71) Applicant: Van Murphy Bed LLC, Chelsea, MI (US)

(72) Inventors: Norman Theodore Barron, Chelsea, MI (US); Jamison Rantz, Ann Arbor, MI (US)

(73) Assignee: VAN MURPHY BED LLC, Chelsea, MI (US)

( * ) Notice: Subject to any disclaimer, the term of this patent is extended or adjusted under 35 U.S.C. 154(b) by 132 days.

(21) Appl. No.: 18/539,641

(22) Filed: Dec. 14, 2023

(65) Prior Publication Data

US 2024/0109469 A1    Apr. 4, 2024

Related U.S. Application Data

(63) Continuation-in-part of application No. 17/687,024, filed on Mar. 4, 2022, now Pat. No. 11,846,387.

(60) Provisional application No. 63/156,569, filed on Mar. 4, 2021.

(51) Int. Cl.
*B60N 3/00* (2006.01)

(52) U.S. Cl.
CPC .............. *B60N 3/001* (2013.01); *B60N 3/008* (2013.01)

(58) Field of Classification Search
CPC .............. F16M 13/02; F16M 2200/041; F16M 2200/066; B60R 11/00; B60R 2011/0003; B60R 2011/0082; A47B 46/005; A47B 96/07; A47B 96/061; A47C 17/80; B60N 3/001; B60N 3/008

USPC ......... 248/247, 300, 584, 201, 213.1, 276.1, 248/284.1

See application file for complete search history.

(56) References Cited

U.S. PATENT DOCUMENTS

| | | | | |
|---|---|---|---|---|
| 727,492 | A * | 5/1903 | Temple et al. ......... | B60J 7/1265 296/107.09 |
| 2,807,441 | A * | 9/1957 | Sewell ................... | E21B 7/021 173/159 |
| 6,564,515 | B1 * | 5/2003 | Fontenot ................. | E02D 5/80 114/294 |
| 7,448,703 | B2 * | 11/2008 | Kung .................... | E05D 15/262 312/327 |
| 8,424,161 | B2 * | 4/2013 | Sutterlutti ............. | E05F 5/006 16/84 |
| 8,468,653 | B2 * | 6/2013 | Tumler ................. | E05D 15/463 49/246 |
| 2001/0039762 | A1 * | 11/2001 | Giovannetti .......... | E05F 1/1091 49/246 |

(Continued)

*Primary Examiner* — Muhammad Ijaz
(74) *Attorney, Agent, or Firm* — Mitchell Law PLLC; Matthew W. Mitchell

(57) ABSTRACT

A recreational vehicle is disclosed. The recreational vehicle includes a first plurality of elongated vertical members coupled to the vehicle, a first plurality of brackets coupled thereto, wherein each of the plurality of brackets includes a first and second opposing sides having a distance therebetween, wherein the first side includes a first flap extending the distance therebetween at a top side, and a second flap extending the distance therebetween at an adjacent side, and a third flap extending the distance therebetween opposing the second flap, and wherein the third flap is coupled to one of the plurality of elongated vertical members. In various embodiments, the brackets can include pivoting members to support a bed or shelf.

20 Claims, 19 Drawing Sheets

(56) References Cited

U.S. PATENT DOCUMENTS

| | | | |
|---|---|---|---|
| 2005/0188505 A1* | 9/2005 | Bennett | E05D 3/16 16/366 |
| 2007/0176068 A1* | 8/2007 | Kuo-Chen | F16K 27/067 248/300 |
| 2010/0229672 A1* | 9/2010 | Brunnmayr | E05D 15/46 74/490.07 |
| 2012/0000130 A1* | 1/2012 | Kashiwaguma | E05F 1/1058 49/348 |
| 2019/0084461 A1* | 3/2019 | Le Corre | A47B 13/081 |
| 2021/0276381 A1* | 9/2021 | Ebbenga | B60D 1/155 |
| 2022/0282829 A1* | 9/2022 | Barron | B60R 11/00 |
| 2023/0371685 A1* | 11/2023 | Rathbun | A47B 13/081 |
| 2024/0123885 A1* | 4/2024 | Tatini | A47B 96/027 |

\* cited by examiner

RECREATIONAL VEHICLE HAVING A PLURALITY OF SUPPORT BRACKETS

CROSS REFERENCE TO RELATED APPLICATIONS

This application is a continuation-in-part of now allowed U.S. application Ser. No. 17/687,024 filed Mar. 4, 2022, which claims the benefit of Provisional Application No. 63/156,569 filed on Mar. 4, 2021 which are hereby incorporated herein by reference.

TECHNICAL FIELD

This disclosure relates to brackets, and more particularly to brackets configured to receive a cantilevered support member for selective rotation.

BACKGROUND

The statements in this section merely provide background information related to the present disclosure and may not constitute prior art.

It is often advantageous to use a bracket to attach one element to another and/or support an element. For example, known brackets are used to support shelves, and structures in building construction applications. Known brackets are disadvantaged in that they are not configured to permit rotation or pivoting of a support member.

Therefore, a need exists for a bracket to engage with a selectively rotatable and cantilevered support member.

SUMMARY

A recreational vehicle is disclosed. The recreational vehicle includes a first plurality of elongated vertical members coupled to the vehicle, a first plurality of brackets coupled thereto, wherein each of the plurality of brackets includes a first and second opposing sides having a distance therebetween, wherein the first side includes a first flap extending the distance therebetween at a top side, and a second flap extending the distance therebetween at an adjacent side, and a third flap extending the distance therebetween opposing the second flap, and wherein the third flap is coupled to one of the plurality of elongated vertical members. In various embodiments, the brackets can include pivoting members to support a bed or shelf.

A bracket is disclosed with a removable support member. The bracket includes a first and second opposing sides having a distance therebetween, where a first flap spans the distance at a top side, and a second flap spans the distance at a side, and a third flap spans the distance at a bottom side, wherein the first and second opposing sides can include corresponding U-shaped slots and at least one aperture configure to receive a pin.

Certain embodiments of the inventive bracket permit selectively rotation of the support member i.e., the bracket permits selective multi-positioning support of the support member.

This summary is provided merely to introduce certain concepts and not to identify key or essential features of the claimed subject matter.

BRIEF DESCRIPTION OF THE DRAWINGS

One or more embodiments will now be described, by way of example, with reference to the accompanying drawings, in which:

FIG. 13 shows an exemplary application of the bracket, in accordance with the present disclosure;

DETAILED DESCRIPTION

Figure 1:
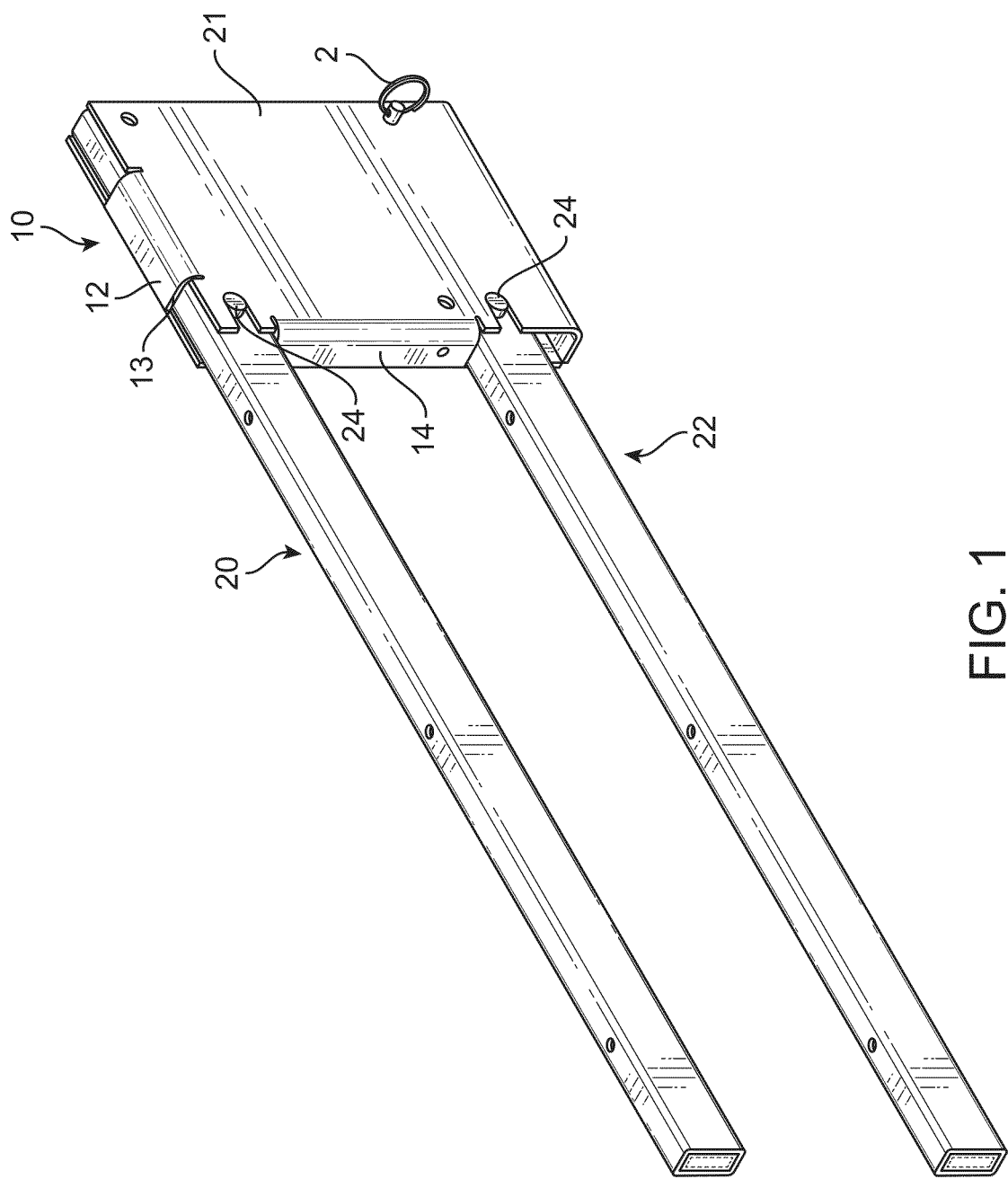
FIG. 1 is a front perspective view of the bracket and removable support members, in accordance with the present disclosure.
Figure 2:
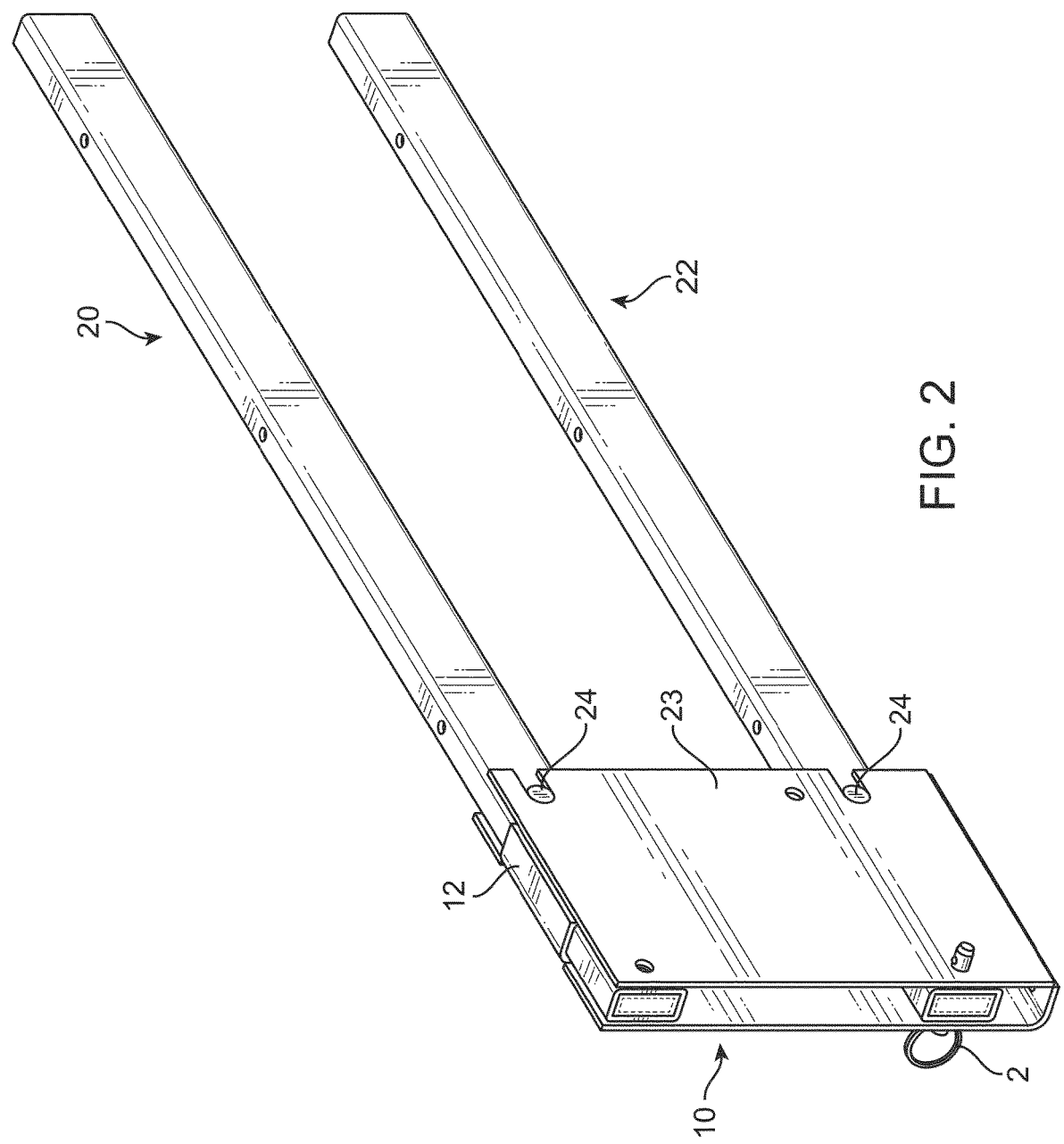
FIG. 2 is rear isometric view, in accordance with the present disclosure.
Figure 3:
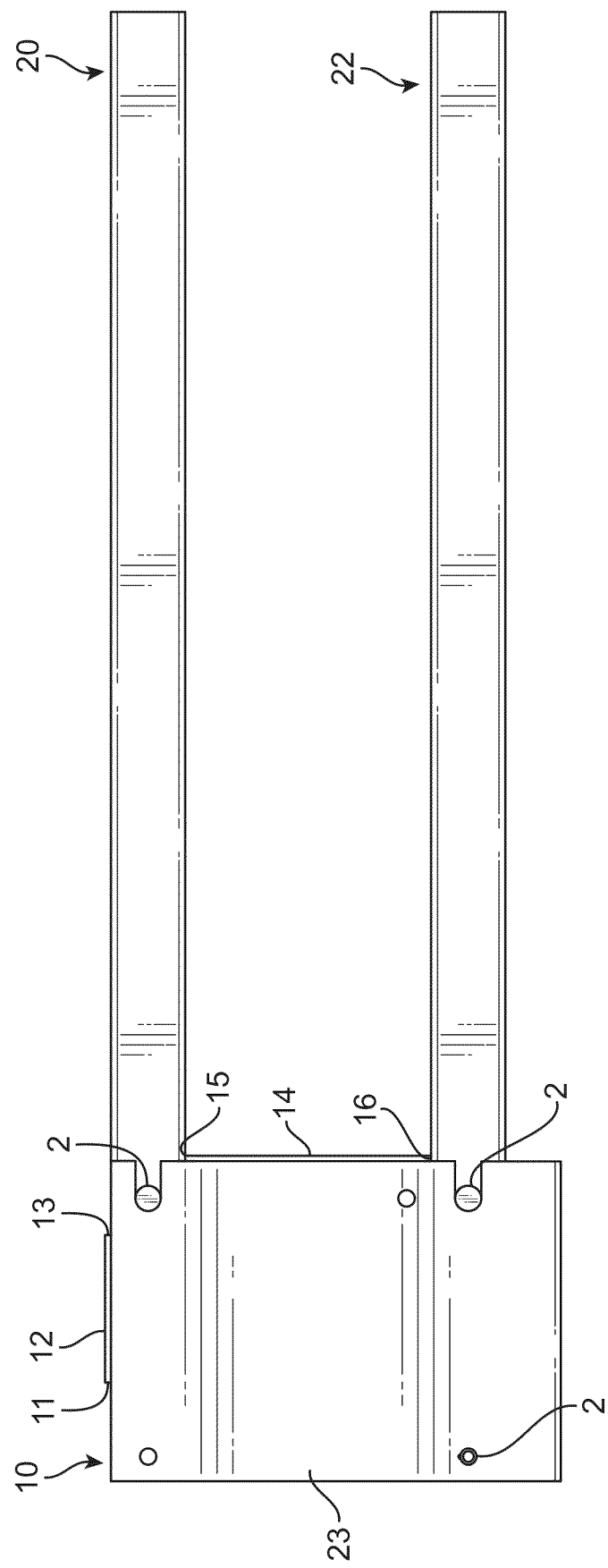
FIG. 3 is yet another front view, in accordance with the present disclosure.
Figure 4:
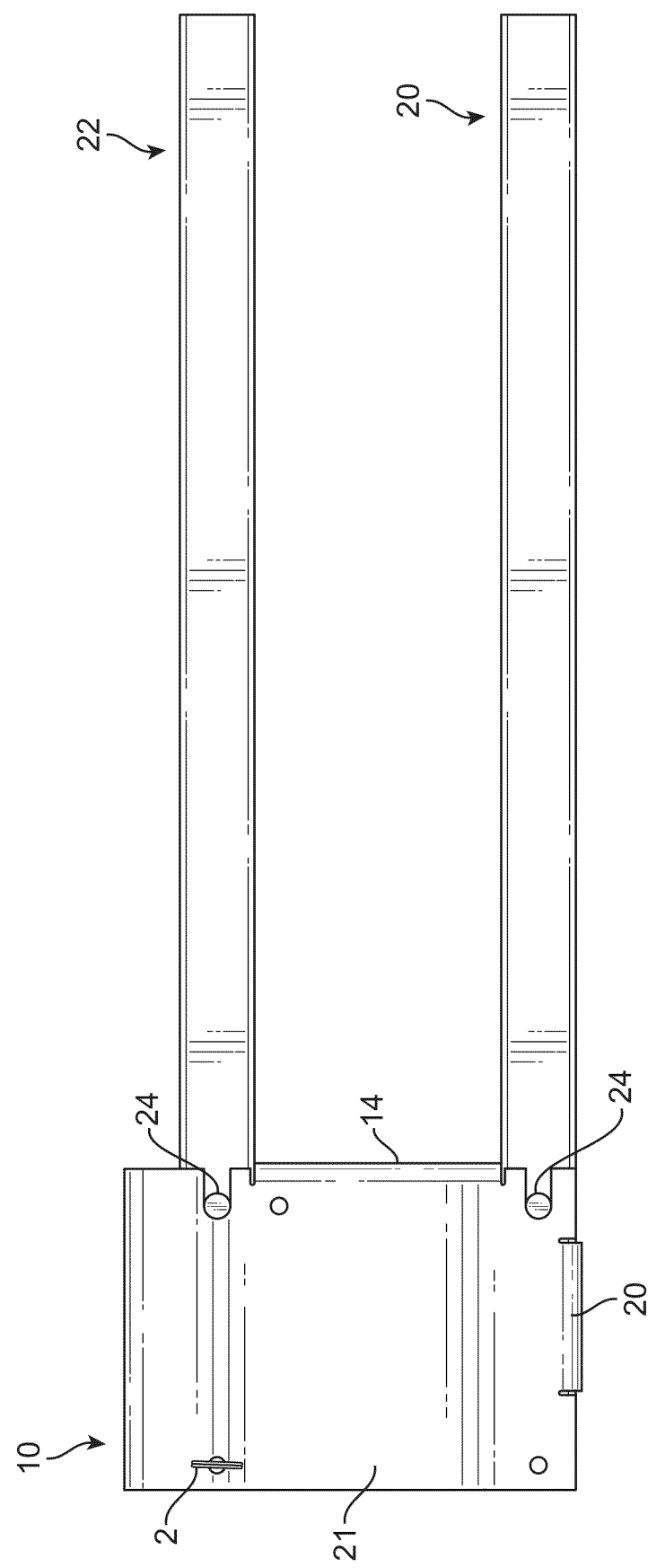
FIG. 4 a rear view, in accordance with the present disclosure.
Figure 5:
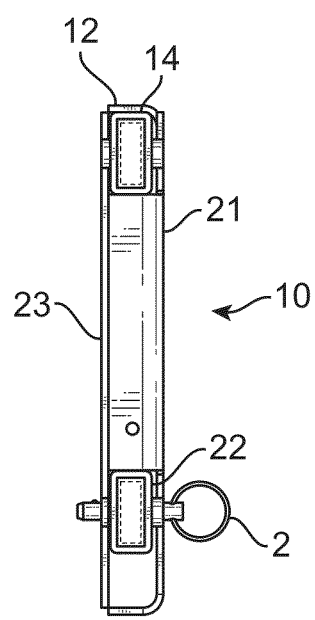
FIG. 5 is a front view, in accordance with the present disclosure.
Figure 6:
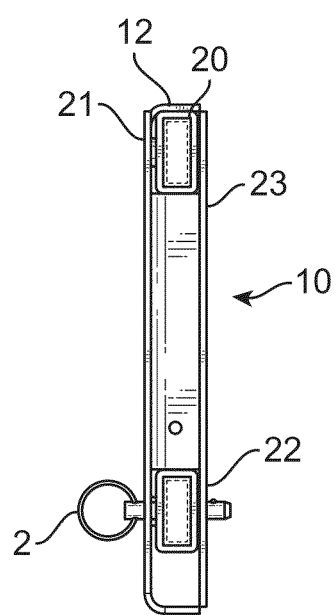
FIG. 6 is a right-side view, in accordance with the present disclosure.
Figure 7:
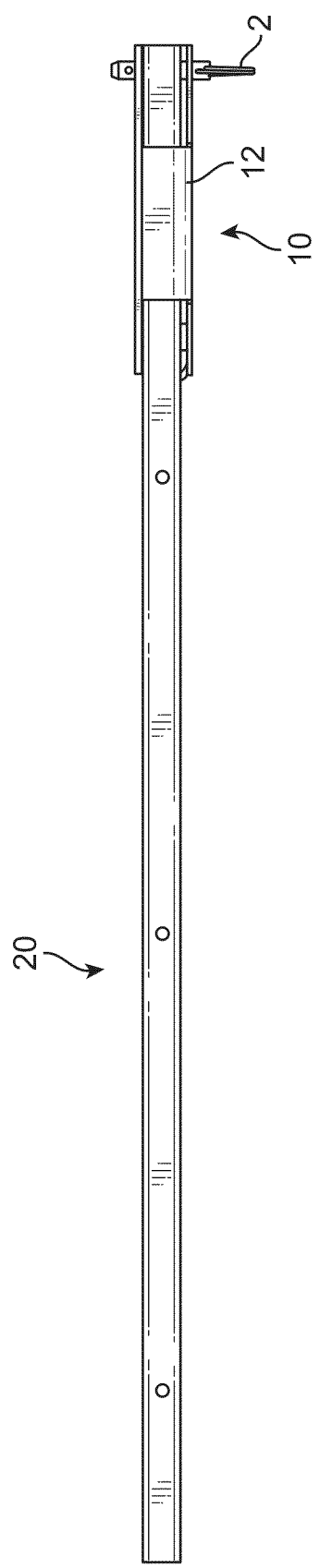
FIG. 7 is a left-side view, in accordance with the present disclosure.
Figure 8:
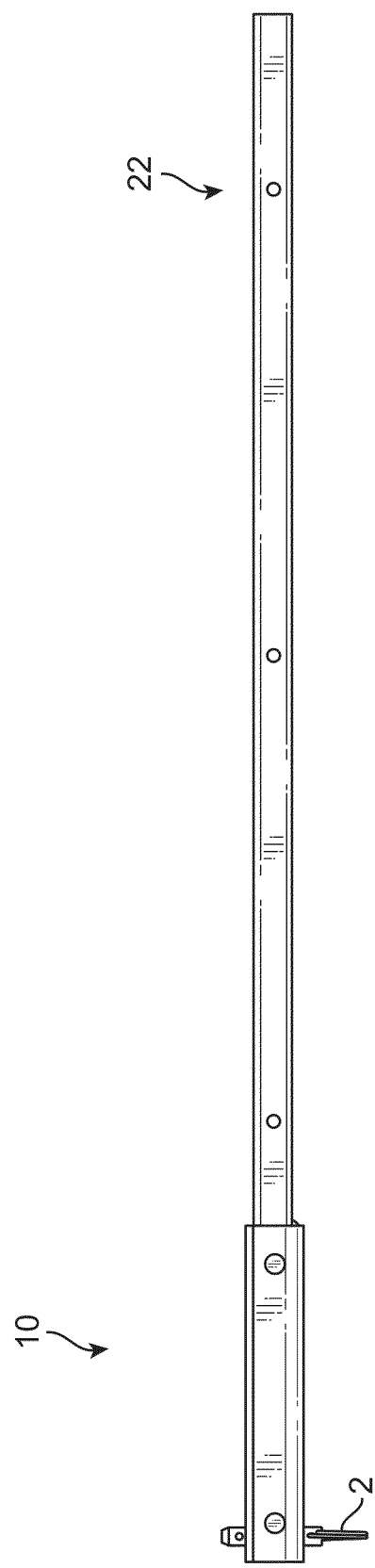
FIG. 8 is a top plan view, in accordance with the present disclosure.
Figure 9:
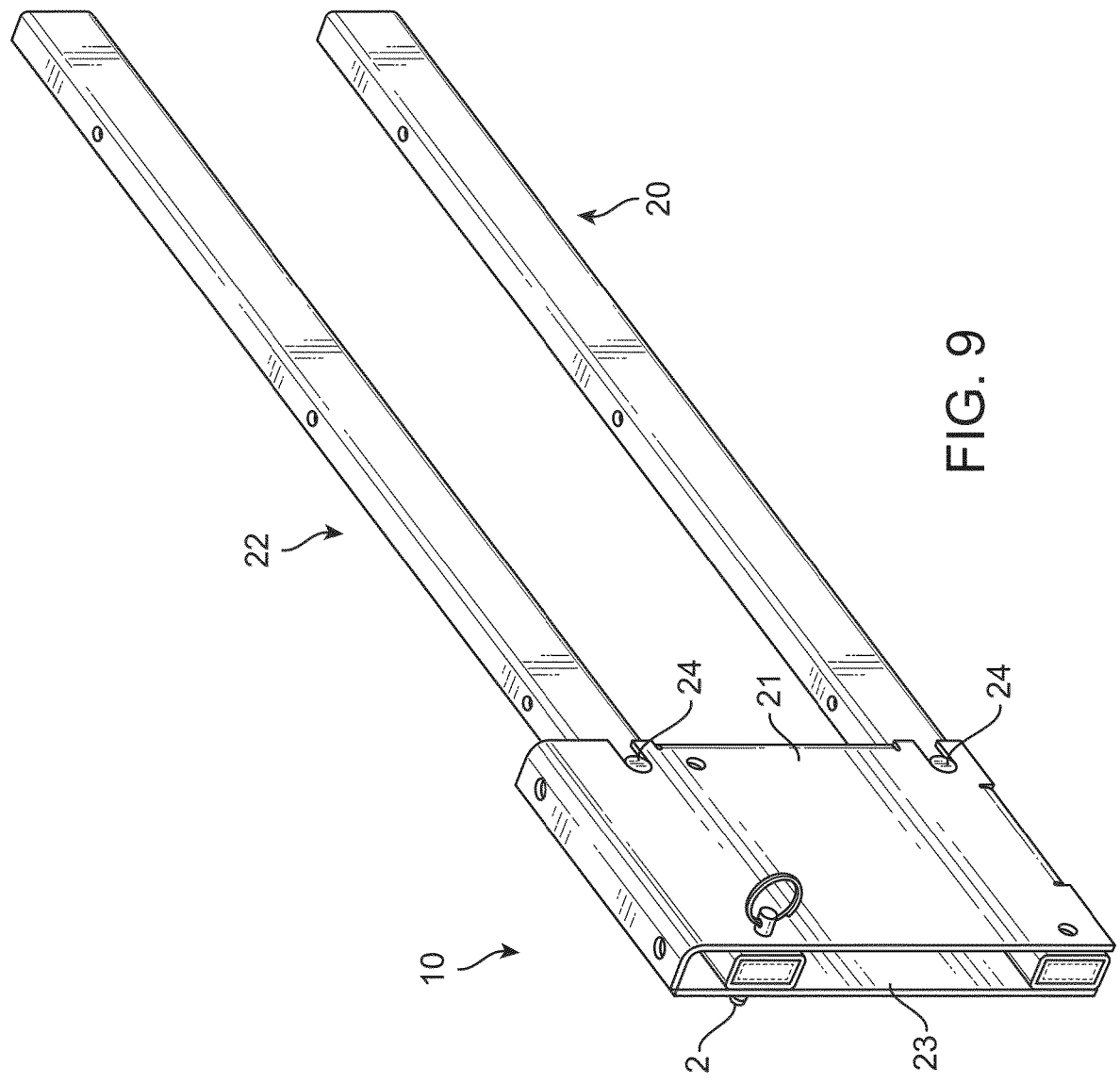
FIG. 9 is a bottom plan view, in accordance with the present disclosure.

Reference throughout this specification to "one embodiment," "an embodiment," or similar language means that a particular feature, structure, or characteristic described in connection with the embodiment is included in at least one embodiment of the subject matter of the present disclosure. Appearances of the phrases "in one embodiment," "in an embodiment," and similar language throughout this specification may, but do not necessarily, all refer to the same embodiment.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

As used in the description herein and throughout the claims, the following terms take the meanings explicitly associated herein, unless the context clearly dictates otherwise: the meaning of "a," "an," and "the" includes plural reference, the meaning of "in" includes "in" and "on." The term "based upon" is not exclusive and allows for being based on additional factors not described, unless the context clearly dictates otherwise. Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner.

Referring now to the drawings, wherein the depictions are for the purpose of illustrating certain exemplary embodiments only and not for the purpose of limiting the same, FIGS. 1-9 show various views of the bracket 10 with a first and second exemplary support members 20 and 22, respectively. The exemplary support members 20 and 22 are removable from the bracket 10. The exemplary support members 20 and 22 may be secured with removable pins 24 or a quick release pin 2.

The bracket 10 is a generally hollow structure having various openings and apertures to receive the support members and the pins. In one embodiment, the bracket 10 includes a first and second U-shaped cutaways 5, i.e., openings, sized and shaped to receive pins or protrusions associated with the support members. The U-shaped cutaways are configured to allow movement in a single axial direction, while preventing it along another perpendicular axis. The bracket 10 further includes apertures 3 that are sized and shaped to receive a pin 2 that can pass through a corresponding aperture of the support member. The apertures 3 are opposing, i.e., there are apertures on either side of the bracket to enable the pin 2 to traverse from one side to another.

The pins 24 may be integral with the respective support member 20 and 24. The pin 2 may be selectively removed and configured to pass through an aperture on either side of the bracket 10 and the support member 22. The pins 24 may be a quick release pin type secured within the support members 20 and 22. In one embodiment, the pins 24 are a protrusion sized to fit fairly close to the U-shaped cutaway on either side of the bracket. The pins 24 are configured to support up or downward forces from the support members 20 and 24 when engaged within the U-shaped cutaway.

In various embodiments, the pins 24 and 2, may be various other mechanical type fasteners configured to secure the support member 20 or 22 and/or provide support against weighted downward movement or upward forces, i.e., securing from up or down movement while engaged within the U-shaped cutaway. Examples of different types of elements that could be substituted for pins 24 and 2 includes but is not limited to a nut and bolt attachment, a clevis pin, a cotter pin, a roll pin, a hitch pin, retainer pin, or a snap pin.

As FIGS. 1-9 show, support members 20 and 22 are engaged within the bracket 10. It is contemplated herein that either one of the brackets may be removed as desired based upon the particular application. As FIGS. 1-9 show, the support member 20 is inserted within the bracket 10. In various applications, the support member 20 may be rotated 90-degrees by pulling the support member 20 out then lifting into a vertical position, such as shown in FIG. 10.

When engaged within the bracket 10, the support members 20 and 22 are secured from undesirable movement via the pins 24 and 2 within the U-shaped cutaways, via underside surface portions of the bracket 10 formed by side flaps 12 and 14, and via edges of an opposing side flap 12 or 14.

Figure 10:
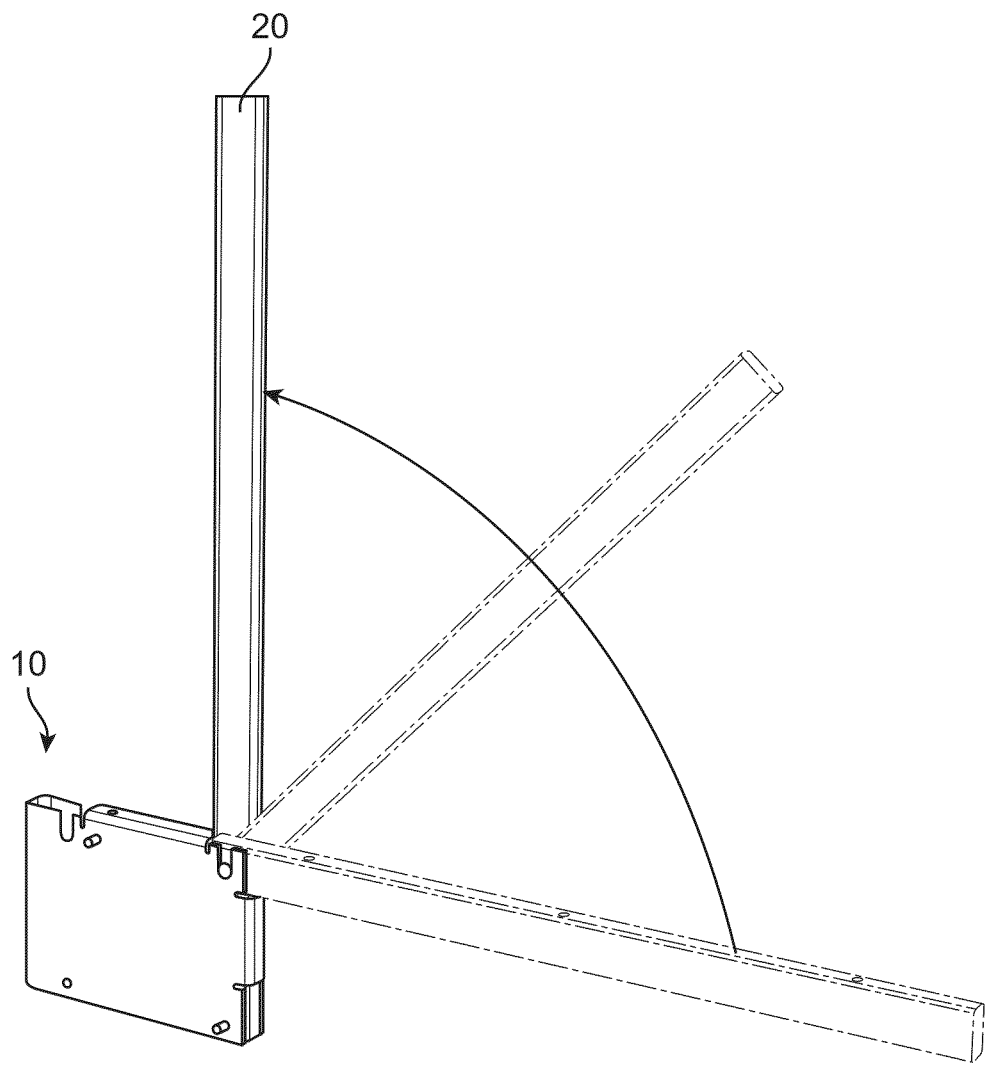
FIG. 10 depicts rotation of a support member within the bracket, in accordance with the present disclosure.

With reference to FIG. 10, the support member 20 is rotated from a first position (shown horizontally) to a second position (shown vertically). When in the first position, the support member 20 is secured in place via rotation at the pin 24 point against an underside of the flap 14. The flap 14 engages a surface of the support member 20, holding the support member 20 in place. An edge 13, of a second flap 12 also prevents downward movement. In the second position, such as depicted in FIGS. 1-7, the support member 20 is secured in place from horizontal forces via the pins 24 and an edge 15 of the flap 14 and the underside of flap 12.

When the support member 22 is in this vertical position, such as shown in FIGS. 1-7, the pins 24 and 2, and an edge 16 of the flap 14, prevents horizontal movement. Vertical movement may be prevented with the pin 2.

The flaps 12 and 14 may be integral with the bracket 10 or formed thereon via welding or mechanical connections.

The bracket 10 may be formed of many known materials, including, e.g., steel, galvanized steel, injection molded plastic, polymers, or various ceramics, depending on the particular intended application. In one embodiment, the bracket 10 is formed from a single sheet of steel. Although it is contemplated that the bracket 10 may be formed using one or more techniques including e.g., milled, deposited, molded, formed through an extrusion process, formed through the welding of different metal sheets to form a structure, etc. The support structures 20 and 22, may be similarly formed.

Figure 11:
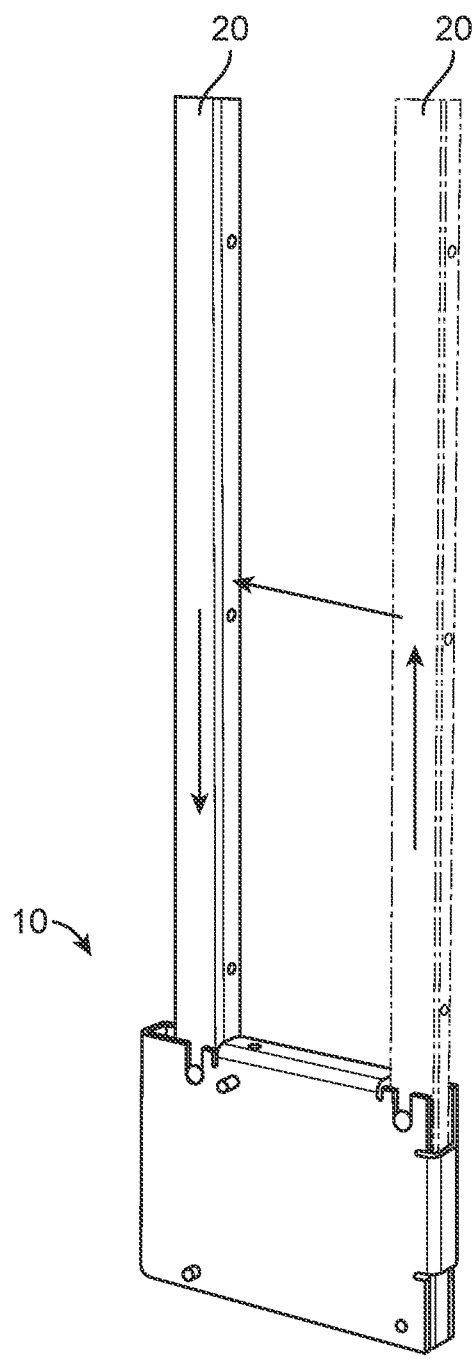
FIG. 11, shows that the bracket 10 will allow a user to remove the support member from one position and insert it into another position, in accordance with the present disclosure.

FIG. 11, shows that the bracket 10 will allow a user to remove the support member from one position and insert it into another position.

Figure 12A:
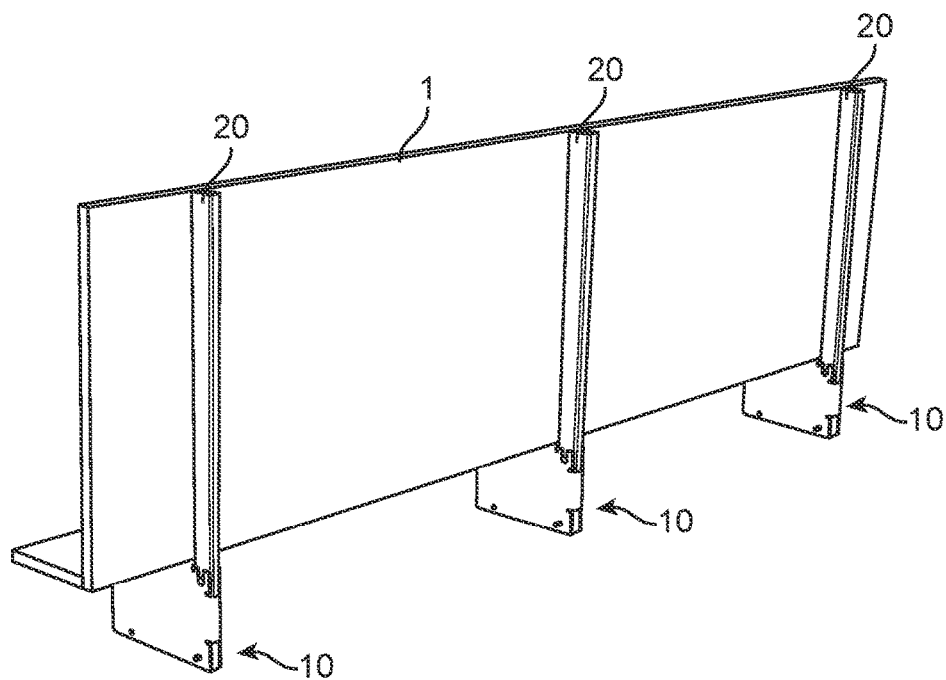
FIGS. 12A, 12B, and 13 show exemplary applications of the bracket, in accordance with the present disclosure.
Figure 12B:
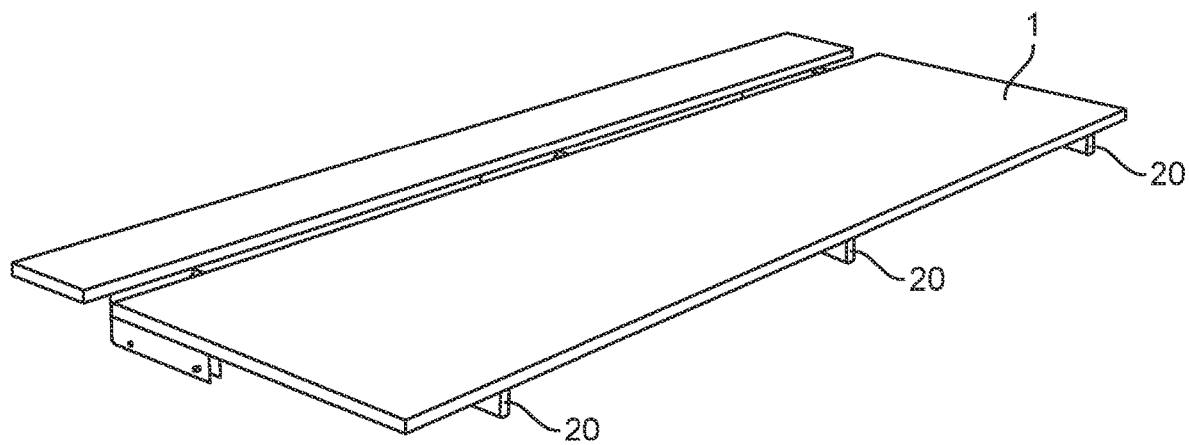
Figure 13:
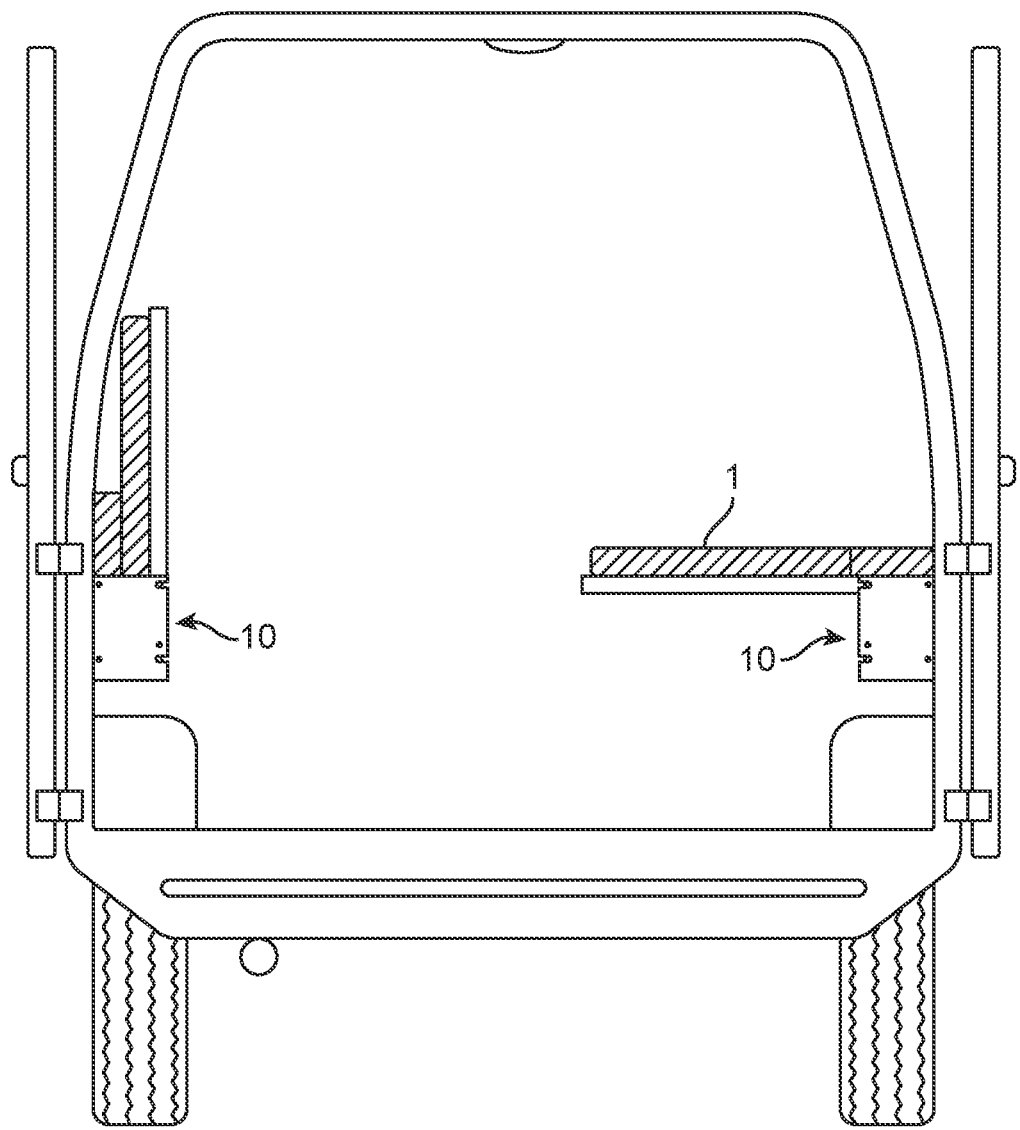

FIGS. 12A, 12B, and 13 show exemplary applications of the bracket 10. As FIGS. 12A and 12B show the brackets can be used to support a rotating shelf 1. FIG. 13 shows the exemplary bracket 10 within a vehicle to support the rotating shelf or a bed 1.

Figure 14A:
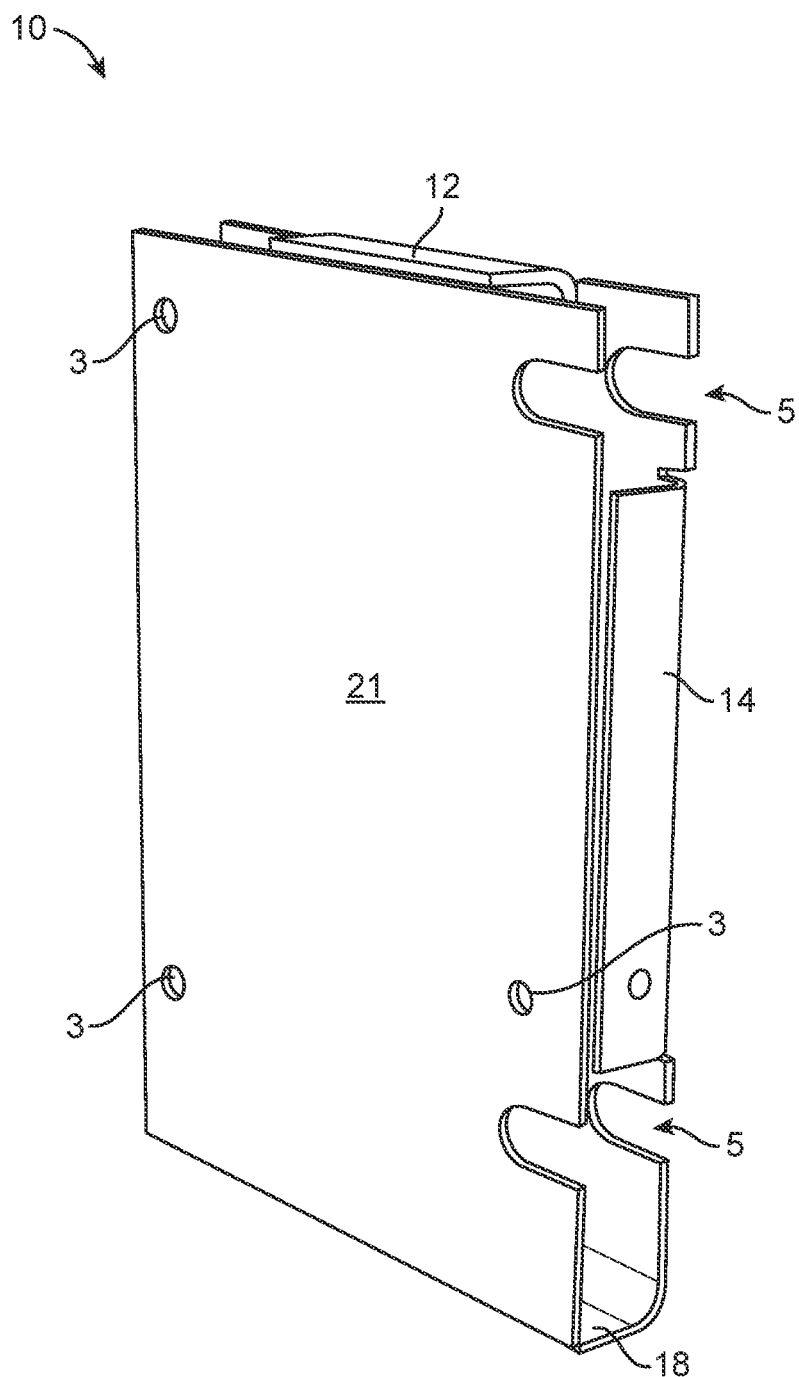
FIGS. 14A and 14B show the bracket without the support members, in accordance with the present disclosure.
Figure 14B:
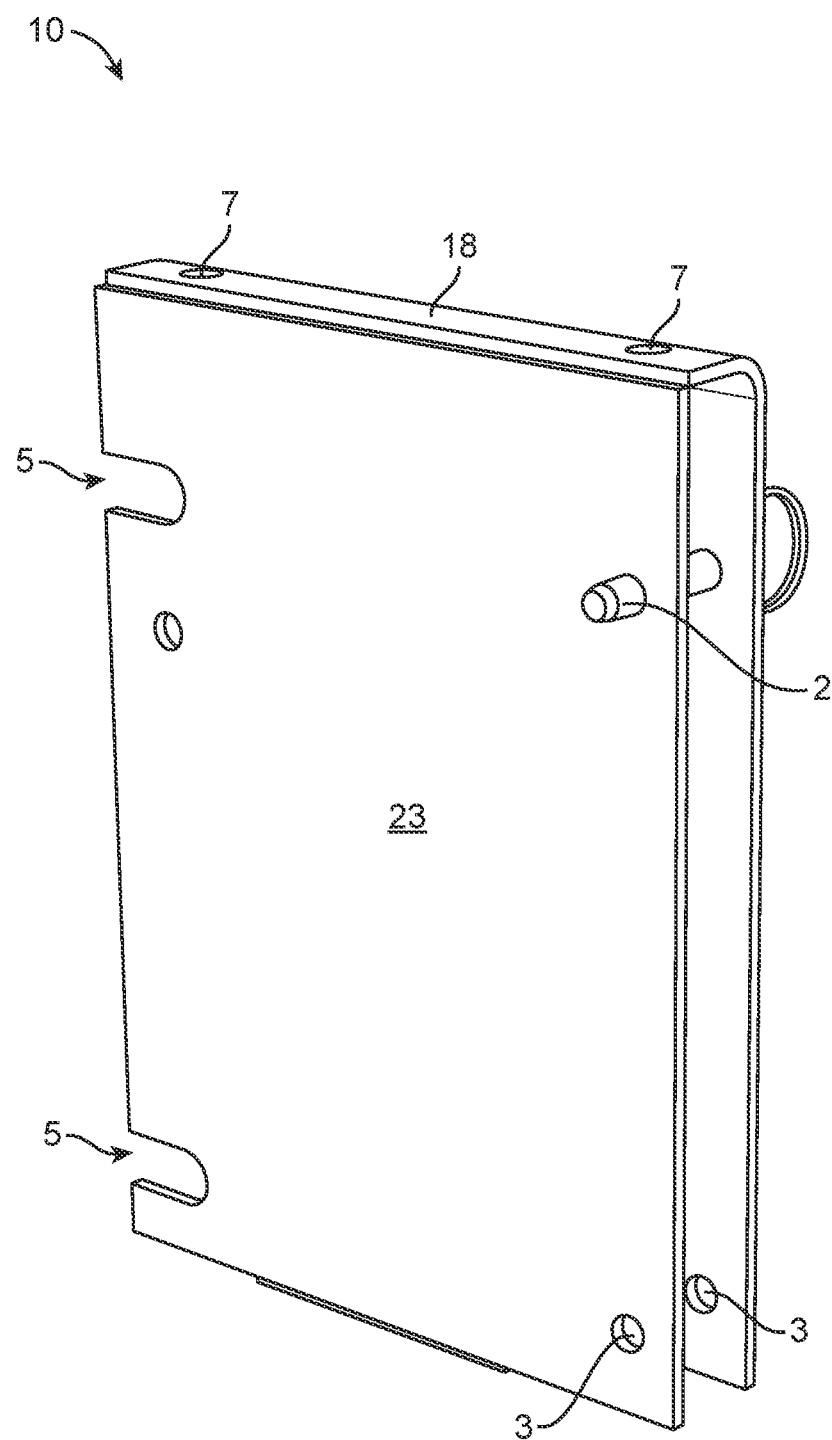

FIGS. 14A and 14B show the exemplary bracket without the support members. As FIGS. 14A and 14B show, the bracket 10 includes a first and second opposing sides 21 and 23 having a distance therebetween, where a first flap 12 spans the distance at a top side, and a second flap 14 spans the distance at a side, wherein the first and second opposing sides include corresponding U-shaped slots 5 and at least one aperture 3 configure to receive a pin or dowel, such as pin 2. In one embodiment, a portion of the side 23 is curved toward the side 21 to form a third flap 18 at a bottom portion. Sides 21 and 23 are substantially planar portions. In one embodiment, the sides 21 and 23 are integrally connected, mechanically connected, and/or physically connected e.g., via welding, to form a U-shape.

As FIGS. 14A and 14B further show, the first and second sides 21 and 23 are substantially parallel with one another, and the flaps 12, 14, and 18 are substantially perpendicular to the sides 21 and 23.

In one embodiment, the opposing sides 21 and 23 and bottom flap 18 are integrally connected.

In one embodiment, flap 18 includes apertures 7 configured to receive a mechanical attachment such as a bolt or a lag screw.

Figure 15:
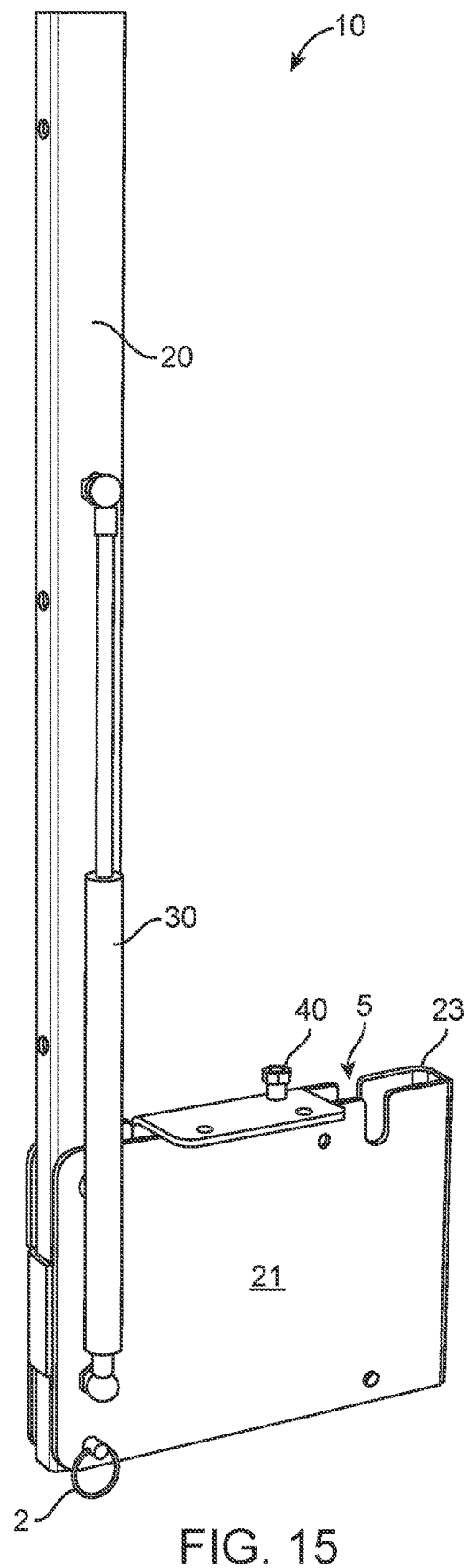
FIG. 15 shows an embodiment of the bracket having a strut in a first position, in accordance with the present disclosure.
Figure 16:
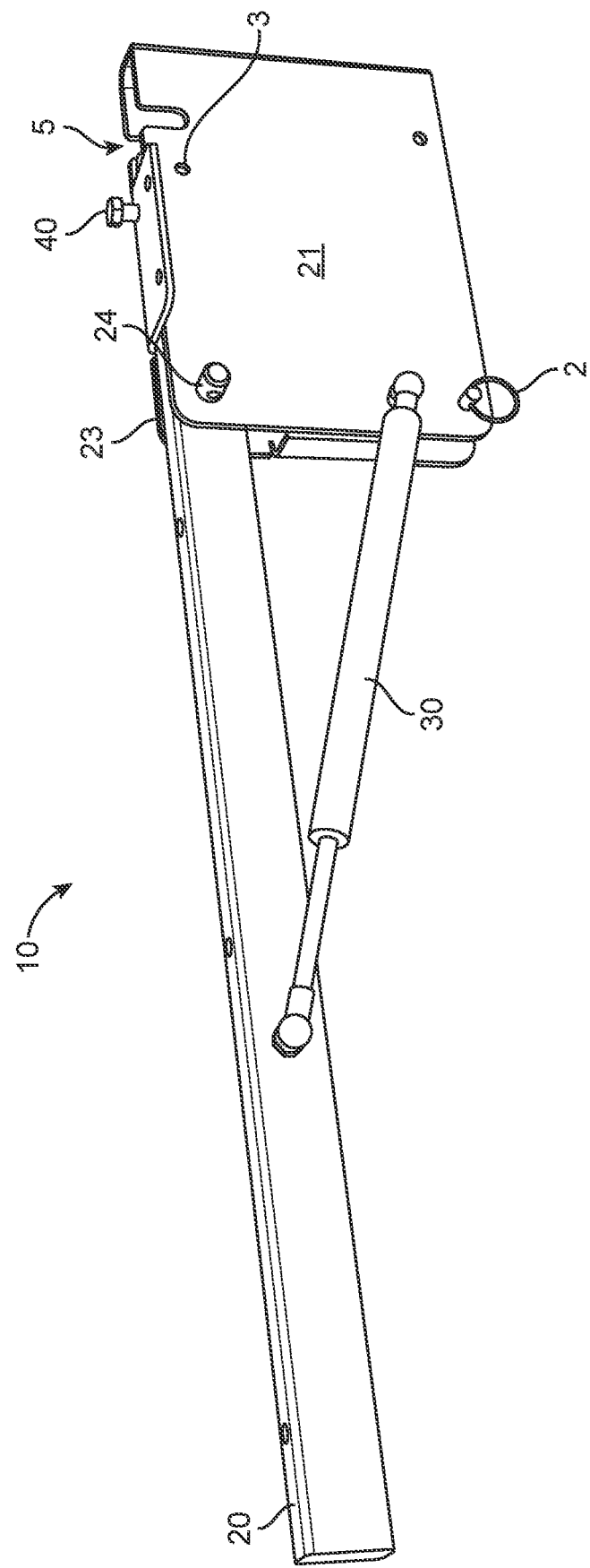
FIG. 16 shows an embodiment of the bracket having a strut in a second position, in accordance with the present disclosure.

FIG. 15 shows an embodiment of the bracket 10 having a strut 30 in a first position, in accordance with the present disclosure. FIG. 16 shows an embodiment of the bracket 10 having a strut 30 in a second position. As FIGS. 15 and 16 show, the bracket 10 can be pivoted/rotated between positions after removing the pin 2. In the second position shown in FIG. 16, the pin 2 can be inserted into aperture 3 to keep the support members 20 from moving.

The bracket 10 can include a mechanical adjustment mechanism 40 such as a screw or bolt. Turning the adjustment mechanism 40 into the bracket 10 will push down on a first end of the support member 20, pushing the other end of the support member upward. Conversely, turning the adjustment mechanism 40 the other way can release the support member 20 on the end proximate to the adjustment mechanism 40, permitting the other end of the support member to tetter downward.

The adjustment mechanism 40 can be used to align the support members 20 or 22 for preferential positioning. For example, if the bracket 10 is attached to a wall that is not quite a true 90-degree wall, the adjustment mechanism 40 can be moved so that the support member 20 is substantially horizontal.

The strut 30 is configured to support the support members 20 or 22. The strut 30 can be most any actuator, damper, gas spring or other length-adjusting support member. In various embodiments, the struct 30 is be formed of a pneumatic or hydraulic cylinder and a rod. The strut 30 can be any actuator configured to pull or push from the first position, e.g., the position depicted in FIG. 15, to the second position, e.g., the position depicted in FIG. 16, and pull or push from the second position to the first position.

The struct 30 is preferably pivotally connected to one of the sides 21 or 23 and pivotally connected to the support member 20.

Figure 17:
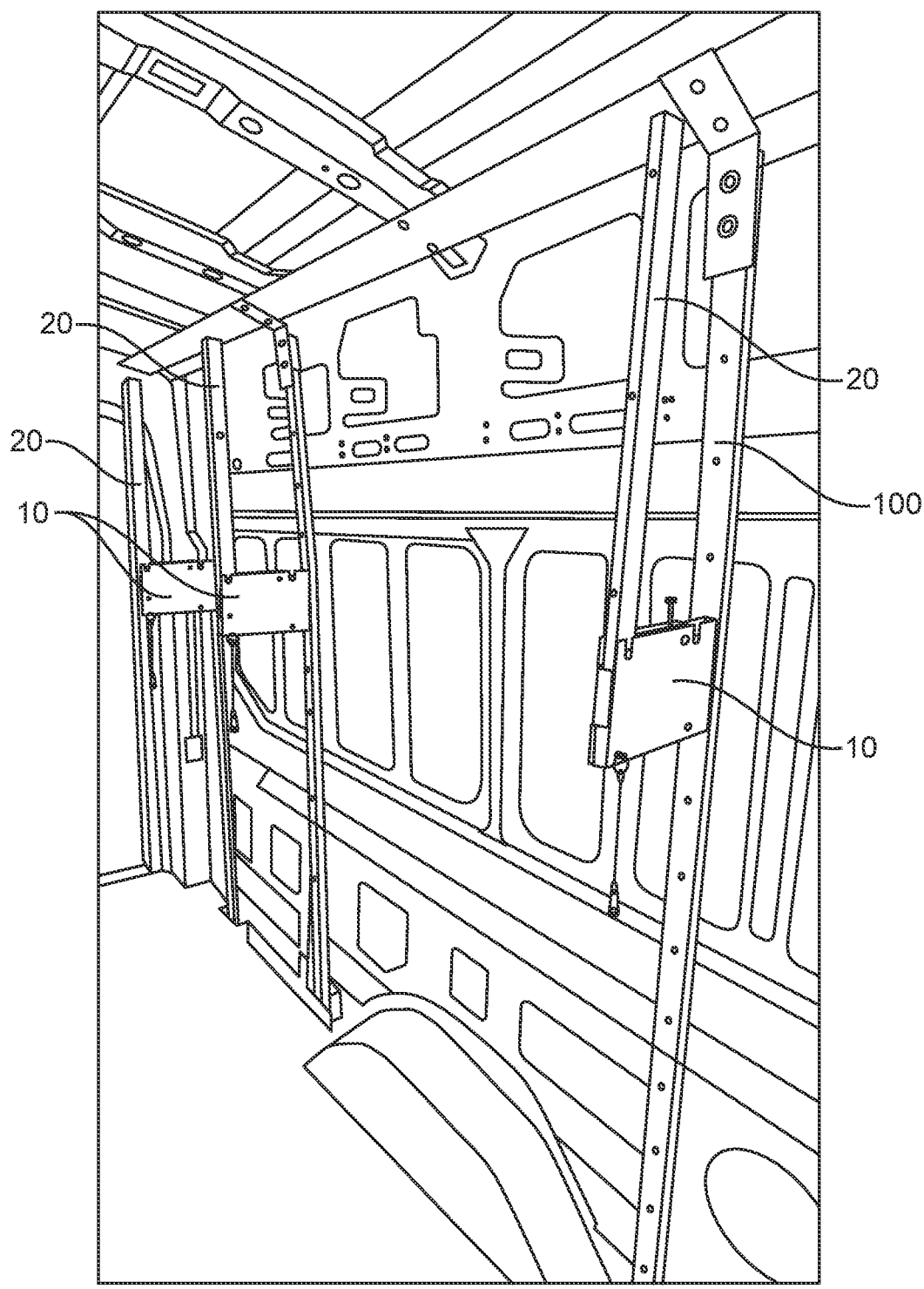
FIGS. 17 and 18 depict exemplary applications of the bracket, in accordance with the present disclosure.
Figure 18:
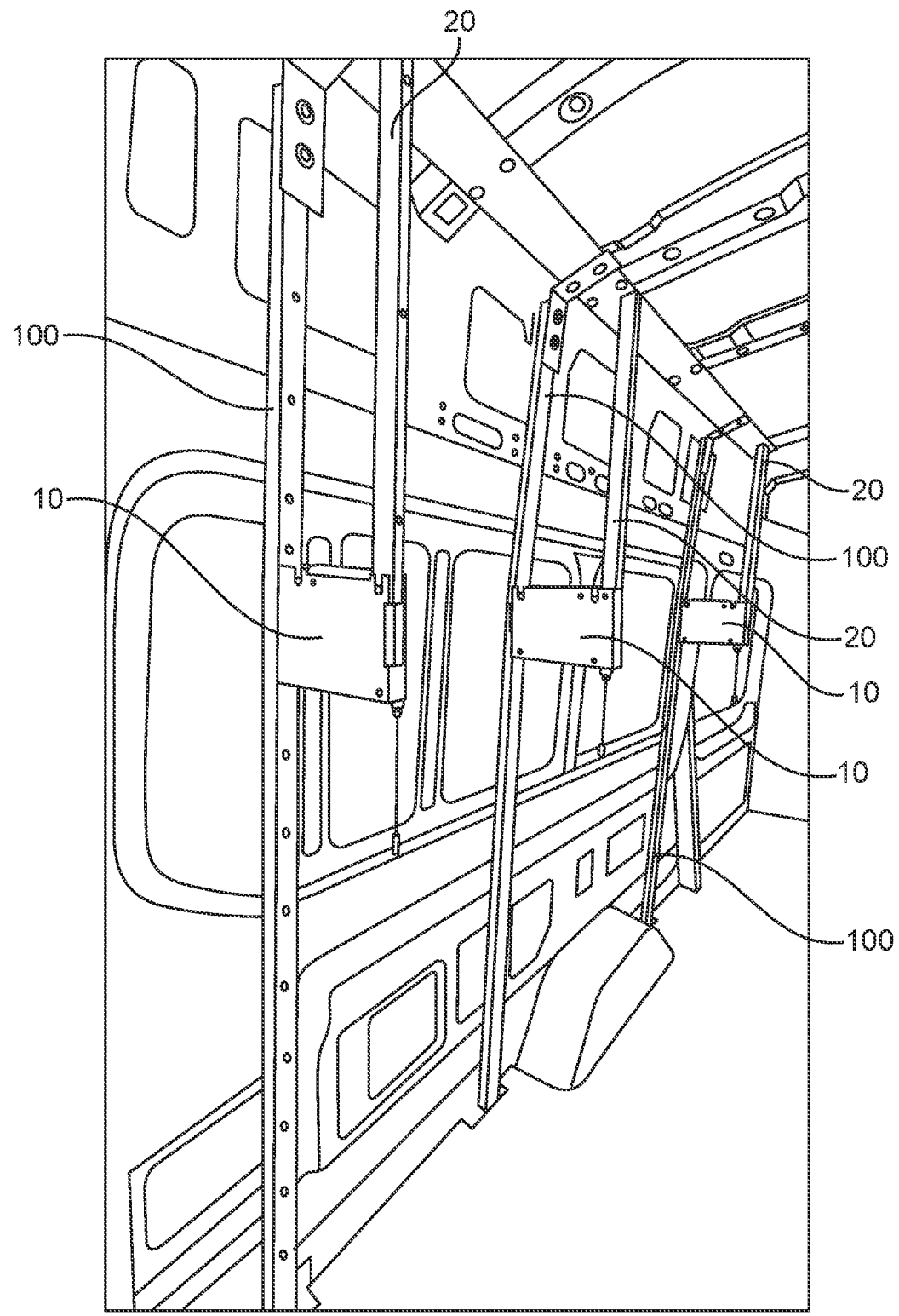

FIG. 17 is a cross-sectional view taken along line A-A of FIG. 16, in accordance with the present disclosure;

FIG. 18 is a cross-sectional view taken along line B-B of FIG. 16, in accordance with the present disclosure; and FIGS. 19 and 20 depict exemplary applications of the bracket, in accordance with the present disclosure. As FIGS. 19 and 20 show, a recreational vehicle may be equipped with a plurality of elongated vertical members 100. The plurality of elongated vertical members 100 are preferably coupled to the vehicle via welding or mechanical connections. In one embodiment, the plurality of elongated vertical members 100 are mechanically connected to side walls and a ceiling portion of the vehicle.

In one embodiment, a bracket 10 is connected to each of the plurality of elongated vertical members 100. The brackets may be connected via welding or mechanical connections. In one embodiment, the brackets are connected via mechanical connection through the apertures 7 of the flap 18. The flap 18 is pressed against the vertical member at a desired location from which a mechanical connection such as a bolt or a lag screw may be fastened through the apertures 7.

In one embodiment, such as depicted in FIG. 13, a first plurality of vertical members and brackets are coupled to a first sidewall of the vehicle and a second plurality of vertical members and brackets are coupled to an opposing sidewall. In this way, a bed or mattress may be placed on top of the selectively removeable elongated support member 20 to desirably take advantage of the width of the vehicle for a single bed, i.e., the first and second plurality of brackets share a horizontal plane.

In one embodiment, a first plurality of brackets and a second plurality of brackets are attached to the first plurality of vertical members. In this way, a mattress may be arranged in a "bunk" fashion, i.e., the first and second plurality of brackets are on different horizontal planes. In a further embodiment, a third plurality of brackets may be attached to the second plurality of vertical members on the opposing sidewall of the vehicle in between, with respect to height, the height of the first and second plurality of brackets. In this way, three levels of separate beds may be made without sharing the same horizontal space.

Additionally, examples in this specification where one element is "coupled," or "connected" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

In the above description, certain terms may be used such as "up," "bottom," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise.

While the foregoing disclosure discusses illustrative embodiments, it should be noted that various changes and modifications could be made herein without departing from the scope of the described embodiments as defined by the appended claims. Accordingly, the described embodiments are intended to embrace all such alterations, modifications and variations that fall within scope of the appended claims. Furthermore, although elements of the described embodiments may be described or claimed in the singular, the plural is contemplated unless limitation to the singular is explicitly stated. Additionally, all or a portion of any embodiment may be utilized with all or a portion of any other embodiments, unless stated otherwise.

The invention claimed is:
1. A recreational vehicle comprising:
a first plurality of elongated vertical members coupled to the vehicle;
a first plurality of brackets, wherein each bracket is coupled to one of the first plurality of elongated vertical members, wherein the bracket comprises,
a first and second opposing sides having a distance therebetween, wherein the first side includes a first flap extending the distance therebetween at a top side, and a second flap extending the distance therebetween at an adjacent side, and a third flap extending the distance therebetween opposing the second flap, and wherein the third flap is coupled to one of the plurality of elongated vertical members; and wherein each bracket comprises a removeable, pivotable elongated support member.

2. The recreational vehicle of claim 1, wherein the plurality of elongated vertical members are coupled to a sidewall of the vehicle.

3. The recreational vehicle of claim 2, further comprising:

a second plurality of elongated vertical members, opposing the first plurality on an opposite sidewall of the recreational vehicle;

a second plurality of brackets, opposing the first plurality, coupled to the second set of elongated vertical members.

4. The recreational vehicle of claim 3, wherein the bracket further comprises a selectively removable elongated support member, having an aperture for receiving a pin and wherein the first and second opposing sides of the bracket comprise corresponding apertures configure to receive the pin.

5. The recreational vehicle of claim 4, wherein the bracket further comprises an actuator pivotally connected to one of the first and second opposing sides and pivotally connected to the selectively removeable elongated support member.

6. The recreational vehicle of claim 1, wherein the first and second plurality of brackets are substantially level with one another.

7. The recreational vehicle of claim 1, wherein the first plurality of brackets occupy a first horizontal plane, and wherein the second plurality of brackets occupy a second horizontal plane.

8. The recreational vehicle of claim 7, wherein the first and second horizontal planes overlap.

9. The recreational vehicle of claim 7, wherein the first and second horizontal planes are different.

10. The recreational vehicle of claim 7, further comprising:

a third plurality of brackets coupled to the first plurality of vertical members, wherein the third plurality of brackets occupy a third horizontal plane.

11. The recreational vehicle of claim 10, wherein the first, second, and third horizontal planes are different.

12. A recreational vehicle comprising:

a first plurality of elongated vertical members coupled to the vehicle; and a first plurality of brackets, wherein each bracket is coupled to one of the first plurality of elongated vertical members, wherein the bracket comprises, a first and second opposing sides having a distance therebetween, wherein the first side includes a first flap extending the distance therebetween at a top side, and a second flap extending the distance therebetween at an adjacent side, and a third flap extending the distance therebetween opposing the second flap, and wherein the third flap is coupled to one of the plurality of elongated vertical members; and wherein the bracket further comprises a selectively removeable elongated support member and an actuator pivotally connected to one of the first and second opposing sides and pivotally connected to the selectively removeable elongated support member.

13. The recreational vehicle of claim 12, wherein the plurality of elongated vertical members are coupled to a sidewall of the vehicle.

14. The recreational vehicle of claim 13, further comprising:

a second plurality of elongated vertical members, opposing the first plurality on an opposite sidewall of the recreational vehicle;

a second plurality of brackets, opposing the first plurality, coupled to the second set of elongated vertical members.

15. The recreational vehicle of claim 14, wherein the bracket further comprises a selectively removeable elongated support member, having an aperture for receiving a pin and wherein the first and second opposing sides of the bracket comprise corresponding apertures configure to receive the pin.

16. The recreational vehicle of claim 15, wherein the bracket further comprises an actuator pivotally connected to one of the first and second opposing sides and pivotally connected to the selectively removeable elongated support member.

17. The recreational vehicle of claim 12, wherein the first and second plurality of brackets are substantially level with one another.

18. The recreational vehicle of claim 12, wherein the first plurality of brackets occupy a first horizontal plane, and wherein the second plurality of brackets occupy a second horizontal plane.

19. The recreational vehicle of claim 18, further comprising:

a third plurality of brackets coupled to the first plurality of vertical members, wherein the third plurality of brackets occupy a third horizontal plane.

20. The recreational vehicle of claim 19, wherein the first, second, and third horizontal planes are each configured to receive a mattress.

* * * * *